United States Patent [19]
Kato et al.

[11] 4,238,341
[45] Dec. 9, 1980

[54] COMPOSITION OF MAGNETIC RECORDING MEDIA

[75] Inventors: Yoshiki Kato, Tokyo; Heigo Ishihara, Hachioji; Hajime Fukke, Inagi; Katsuyoshi Chiba; Waichi Nagashiro, both of Hachioji; Teruo Tsunoda, Tokyo; Munehisa Mitsuya, Hachioji, all of Japan

[73] Assignee: Hitachi, Ltd., Japan

[21] Appl. No.: 84,453

[22] Filed: Oct. 12, 1979

[30] Foreign Application Priority Data

Oct. 18, 1978 [JP]  Japan .................. 53-127339

[51] Int. Cl.$^3$ .......................... H01F 1/113
[52] U.S. Cl. .................. 252/62.54; 252/62.58; 427/128; 428/329; 428/413; 428/506; 428/900
[58] Field of Search .......... 252/62.54, 62.58; 428/329, 413, 506, 900; 427/128

[56] References Cited
U.S. PATENT DOCUMENTS

| | | | |
|---|---|---|---|
| 3,622,386 | 11/1971 | Larsen | 252/62.54 X |
| 3,843,404 | 10/1974 | Haefele et al. | 252/62.54 X |
| 3,929,658 | 12/1975 | Beske | 252/62.54 |
| 3,955,037 | 5/1976 | Marx et al. | 252/62.54 X |
| 4,015,042 | 3/1977 | Chassaigne | 428/329 X |
| 4,070,522 | 1/1978 | Ogasa et al. | 252/62.54 X |
| 4,074,002 | 2/1978 | Hack et al. | 252/62.54 X |

FOREIGN PATENT DOCUMENTS

| | | | |
|---|---|---|---|
| 51-31201 | 3/1976 | Japan | 427/128 |
| 548897 | 3/1977 | U.S.S.R. | 252/62.54 |

Primary Examiner—Jack Cooper
Attorney, Agent, or Firm—Craig & Antonelli

[57] ABSTRACT

A composition of magnetic recording media consisting of a ferromagnetic powder such as $\gamma\text{-Fe}_2\text{O}_3$, a binder and single crystal alumina as a reinforcing agent. Single crystal $\alpha$-alumina is preferably used as said single crystal alumina and its amount is preferably from 1 to 20% by weight based on the magnetic powder.

9 Claims, 3 Drawing Figures

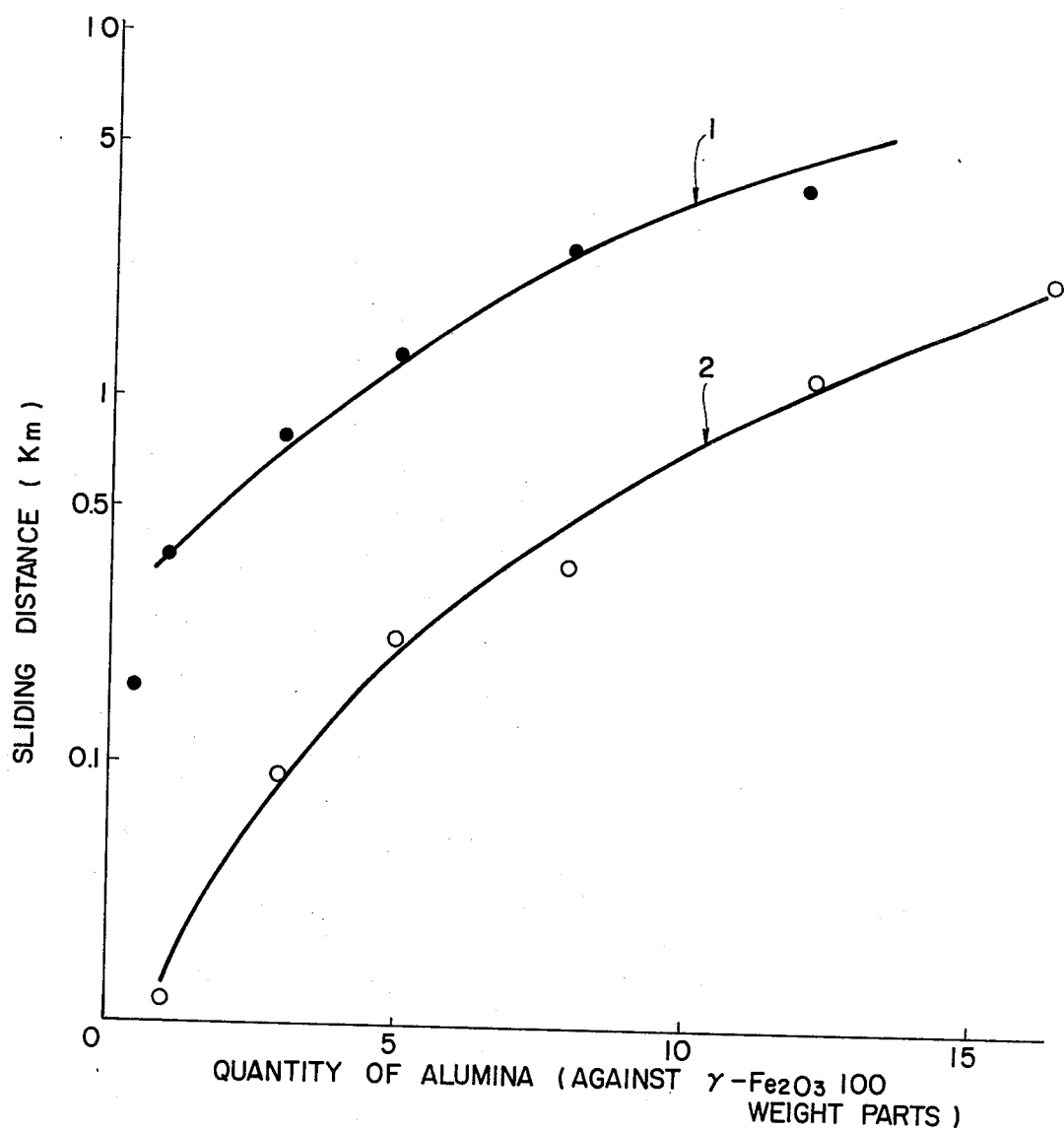

COMPOSITION OF MAGNETIC RECORDING MEDIA

BACKGROUND OF THE INVENTION

This invention relates to a composition of magnetic recording media. More particularly, the present invention relates to constituent components of a recording layer of magnetic recording media such as magnetic tape, magnetic disc and the like.

A magnetic recording medium composition is generally produced by coating onto a non-magnetic substrate a coating material consisting of a binder and a magnetic powder such as $\gamma\text{-Fe}_2\text{O}_3$ and curing the material. Such a method is disclosed, for example, in U.S. Pat. No. 3,198,657. It is requisite that such a magnetic recording medium composition is excellent in magnetic characteristics, mechanical strength, machinability and resistance to a cleaner solvent. In the case of a high density magnetic disc, especially, a magnetic recording medium composition having a thickness of as thin as about 1 $\mu$m must hve sufficient mechanical strength. In a CSS (contact start and stop) type magnetic disc device, a magnetic head is brought into contact with the magnetic disc and is caused to hydrodynamically float due to revolution of the disc. Hence, still severer requirements are imposed on the magnetic recording medium composition in the mechanical strength and impact strength.

In order to satisfy these requirements, there has conventionally been proposed the addition of particles of a non-magnetic solid material having hardness higher than that of a binder, e.g., fused alumina, $\alpha$-alumina for grinding, silicon carbide, chromium oxide, etc., as a reinforcing agent to the binder. This method is disclosed, for example, in Japanese Patent Laid-Open Publication No. 466/1972. Though the magnetic recording medium composition obtained by such method satisfies the requirements to certain extents, the composition is not yet entirely satisfactory. If the amount of the fine powder is increased in order to further satisfy the abovementioned requirements, the magnetic head would be damaged and its service life would be shortened, on the contrary.

List of the Prior Art (37CFR 1.56(a))

The following references are cited to show the state of the art;
U.S. Pat. No. 3,198,657
Japanese Published Unexamined Patent Application No. 466/1972

SUMMARY OF THE INVENTION

It is an object of the present invention to provide an improved composition of magnetic recording media.

This and other objects of the present invention can be accomplished by a composition of magnetic recording media which, in a composition of magnetic recording media consisting of a magnetic powder and a binder, is characterized in that single crystal alumina is incorporated as a reinforcing agent.

BRIEF DESCRIPTION OF THE DRAWINGS

FIGS. 1, 2 and 3 are diagrams useful for explaining the present invention.

DETAILED DESCRIPTION OF THE PREFERRED EMBODIMENTS

The composition in accordance with the present invention consists of a magnetic powder, a binder and single crystal alumina, preferably single crystal $\alpha$-alumina.

Alumina used conventionally has the shape of finely crushed particles because it is used primarily for the grinding purpose. Though being about 0.5 $\mu$m in size, such alumina consists of three to four polycrystals. Accordingly, a part of alumina falls off by friction and is entrapped between the head and the magnetic recording medium, thereby presumably damaging the head or the magnetic recording medium.

When the composition in accordance with the present invention is used, on the other hand, the single crystal does not fall off but only its surface is worn out. Accordingly, neither the head nor the magnetic recording medium is damaged by the crystal, and coating strength of the magnetic recording medium can be increased remarkably. The single crystal $\alpha$-alumina is especially preferred because it is specifically excellent in its wear resistance in comparison with single crystal alumina of other crystal forms.

The amount of the single crystal alumina is preferably from 1 to 20% by weight (based on the magnetic powder), more preferably from 2 to 20% by weight, and most preferably from 2 to 10% by weight. This restriction is based on the results of the sliding contact test which is known as one of the test methods of the magnetic disc. This test evaluates the strength of the coating film in terms of a sliding distance till slide damages occur on the surface of the coating when the magnetic disc is rotated and a slider is brought into pressure and sliding contact with the surface of the head.

FIG. 1 (1) shows the case where the test is carried out at a slider load 20 g. The sliding distance till break of the coating film becomes greater in the composition containing at least 1% by weight of single crystal alumina than in the composition not added with alumina and increases remarkably in the composition containing 2 or more % by weight of the single crystal alumina. FIG. 1 (2) shows the case where alumina for grinding is employed.

Figure 2:
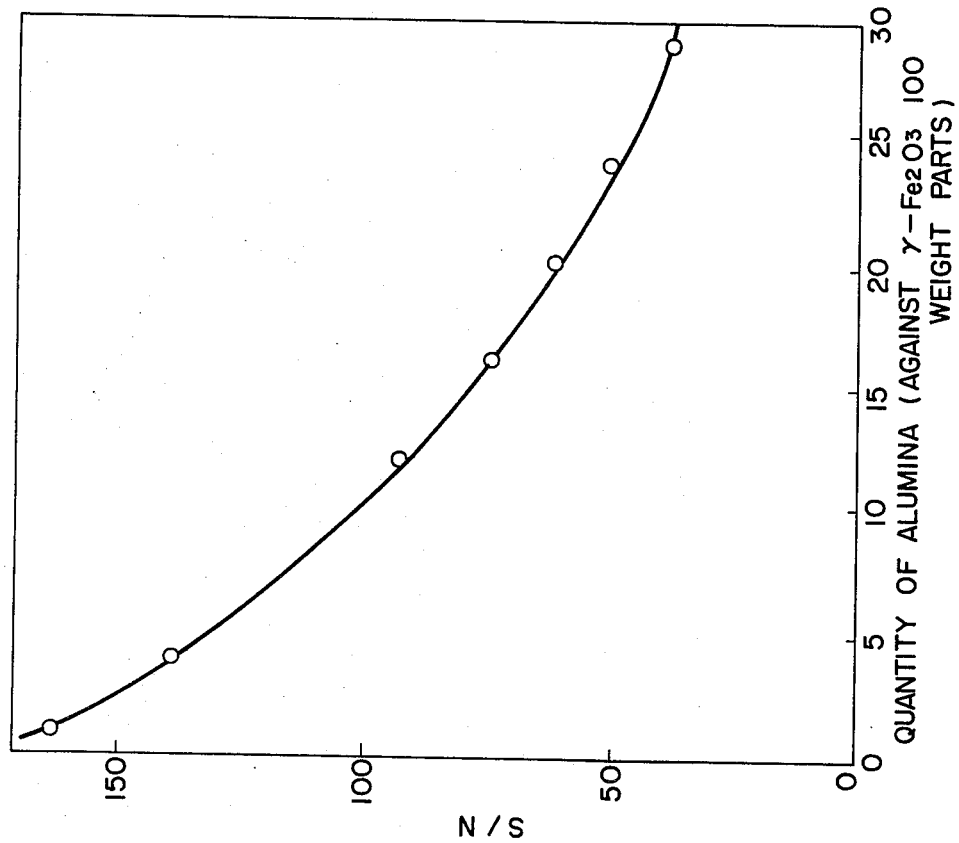

The sliding distance increases with an increasing amount of the single crystal alumina but the signal-to-noise ratio S/N decreases as shown in FIG. 2. For this reason, the amount of the single crystal alumina is preferably smaller than 20% by weight and more preferably not greater than 10% by weight. In FIGS. 1 and 2, incidentally, the alumina quantity represents the amount based on 100 parts by weight of $\text{Fe}_2\text{O}_3$. The grain size of the single crystal alumina is preferably from 0.5 to 5 $\mu$m.

The single crystal alumina of this kind is commercially available from Showa Denko K. K. on a custom-made basis.

As the magnetic powder, any powder may be used such as $\gamma\text{-Fe}_2\text{O}_3$, Co-containing $\gamma\text{-Fe}_2\text{O}_3$, $\text{Fe}_2\text{O}_3$ and the like.

The binder to be used in the present invention is a thermoplastic resin, a thermosetting resin and their mixtures. All the heretofore known binders can be used.

More specifically, the binder includes an epoxy resin, a polyurethane resin, a urea formaldehyde resin, a polyamide resin, a silicone resin, a polyester resin, a phenol-formaldehyde resin, a urea-formaldehyde resin, a vinyl resin, a cellulose resin derivative, polymers or copolymers of acrylic acid or/and methacrylic acid, a polyamide resin, and an alkyd resin. These resins are used either alone or as a mixture.

Among them, a mixture of an epoxy resin, a phenol-formaldehyde resin and a vinyl resin is especially excellent as the binder for the magnetic disc. Examples of the vinyl resin are polyvinyl butyral and polyvinyl acetal.

The amount of the magnetic powder is preferably from 40 to 400% by weight, based on the binder, and more preferably from 50 to 350% by weight.

The magnetic recording medium may be coated onto the substrate by known methods in the art such as spin coating, spraying, dipping or the like. The coating methods are disclosed, for example, in the aforementioned U.S. Pat. No. 3,198,657.

Hereinafter, the present invention will be explained in further detail by comparing examples thereof with a comparative example.

Though the examples of the invention illustrate the case where magnetic alignment is effected, the present invention provides the same effect even in the case where no magnetic alignment is made. Similarly, the present invention provides excellent effect not only for the magnetic disc but also for the magnetic drum and the magnetic tape.

EXAMPLE I 100 parts by weight of the magnetic powder ($\gamma$-$Fe_2O_3$) and 5 parts by weight of the single crystal alumina having an average particle diameter of 1.3 $\mu$m ($\alpha$-$Al_2O_3$) are added to a solvent prepared by dissolving 45 parts by weight of an epoxy resin in 230 parts by weight of cyclohexanone and are then ball-milled for 7 days to disperse the magnetic powder. Thereafter, a magnetic paint for the magnetic disc is prepared by adding 350 parts by weight of cyclohexanone solvent of 2.5% vinyl resin dissolving therein 45 parts by weight of a phenol-formaldehyde resin. The paint is then coated onto an aluminum substrate of which surface is cleaned in advance. The magnetic powder particles in this coating film is aligned by known method. The magnetic powder particles in the coating film are uniformly dispersed. After heat-setting at 200° C. for 2 hours, the film is surface-worked to a film thickness of 1 $\mu$m with surface coarseness $H_{CLA}=0.02\mu$.

COMPARATIVE EXAMPLE 100 parts by weight of the magnetic powder ($\gamma$-$Fe_2O_3$) and 5 parts by weight of alumina for grinding, WA#8000 ($\alpha$-$Al_2O_3$) are added to a solvent prepared by dissolving 45 parts by weight of an epoxy resin in 230 parts by weight of cyclohexanone, and are then ball-milled for 7 days, thereby dispersing the magnetic powder. Thereafter, a magnetic paint for the magnetic disc is prepared by adding 350 parts by weight of cyclohexanone solvent of 2.5% vinyl resin dissolving therein 45 parts by weight of a phenol-formaldehyde resin. The paint is then coated onto an aluminum substrate of which surface is cleaned in advance. The magnetic powder particles in the coating film are uniformly dispersed by the known method. They are dispersed uniformly. After heat-setting at 200° C. for 2 hours, the film is surface-worked to a film thickness of 1 $\mu$m with surface coarseness $H_{CAL}$ 0.02 $\mu$.

Figure 3:
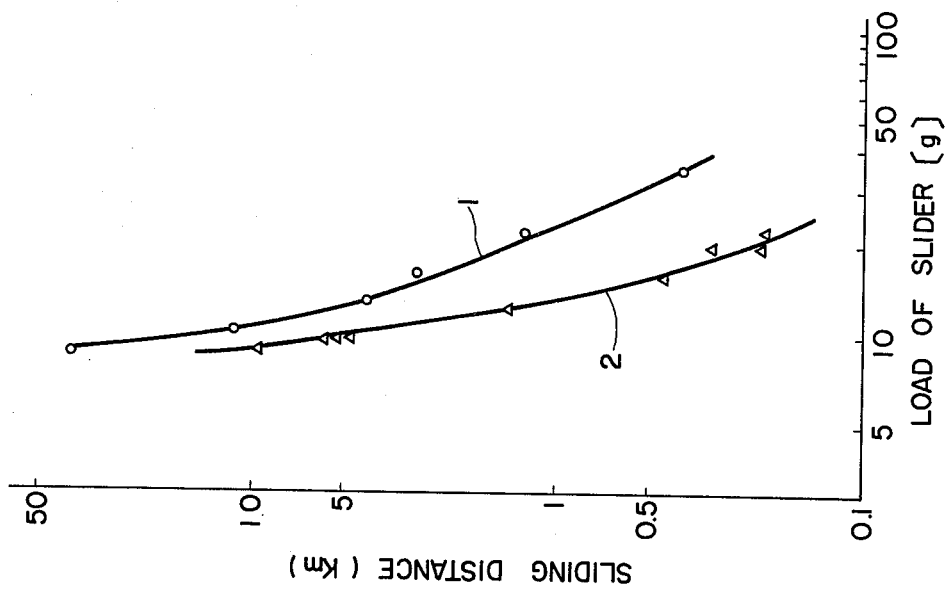

The film strength of each of the magnetic discs produced in Comparative Example and Example 1 is evaluated in terms of the sliding distance till sliding damage occurs on the film surface when the slider is brought into pressure and sliding contact with the surface of the rotary disc. The results are shown in FIG. 3. The curve designated by reference numeral 1 represents the result of Example 1 which uses the single crystal alumina and the curve designated by reference numeral 2 represents the result of Comparative Example which uses alumina for grinding. As can be seen clearly from FIG. 3, the film strength is by from 3 to 10 times stronger in the film using the single crystal alumina than in the film using alumina for grinding.

EXAMPLE 2

100 parts by weight of a magnetic powder ($\gamma$-$Fe_2O_3$) and 5 parts by weight of single crystal alumina having an average particle radius of 1.3 $\mu$m ($\alpha$-$Al_2O_3$) are added to a solvent prepared by dissolving 45 parts by weight of an epoxy resin in 235 parts by weight of cyclohexanone, and ball-milled for 4 days to disperse the magnetic powder. A paint for the magnetic disc is prepared by adding a solvent prepared by dissolving 20 parts by weight of a polyurethane resin and 35 parts by weight of a phenol-formaldehyde resin in 180 parts by weight of cyclohexanone. The paint is then coated onto an aluminum substrate and the magnetic powder particles are aligned by known method. After the film is heat-cured at 200° C. for 2 hours, it is surface-worked to a film thickness 1 $\mu$ with surface coarseness $H_{CLA}=0.02$ $\mu$.

A comparative sample is prepared by replacing the single crystal alumina by alumina for grinding WA8,000 ($\alpha$-$Al_2O_3$) in the abovementioned production method.

The film strength of each of the abovementioned two magnetic discs is evaluated in terms of the sliding distance due to pressure sliding of the slider. It is found that the film using the single crystal alumina has film strength by about 6 times higher than that of the film using alumina for grinding at the slider load 20 g.

What is claimed is:

1. A composition of magnetic recording medium consisting of a ferromagnetic powder, a binder, and single crystal alumina as a reinforcing agent in an amount of from 1 to 20 percent by weight on the basis of said ferromagnetic powder, said composition when coated on a disc exhibiting a greater sliding distance than a corresponding composition of said ferromagnetic powder, binder and same amount of polycrystalline alumina employed for grinding when coated on a disc.

2. The composition of magnetic recording medium as defined in claim 1, wherein the amount of said single crystal alumina is from 2 to 20% by weight on the basis of said ferroomagnetic powder.

3. The composition of magnetic recording medium as defined in claim 1 or 2 wherein the grain size of said single crystal alumina is from 0.5 to 5 $\mu$m.

4. The composition of magnetic recording medium as defined in claim 1 or 2 wherein said binder consists of an epoxy resin, a phenol-formaldehyde resin and a vinyl resin.

5. The composition of magnetic recording medium as defined in claim 4 wherein said vinyl resin is a polyvinyl butyral.

6. A magnetic disc comprising the composition as defined in claim 1.

7. The magnetic disc as defined in claim 6, wherein the grain size of said single crystal alumina is from 0.5 to 5 $\mu$m.

8. The magnetic disc as defined in claim 6, wherein said binder consists of an epoxy resin, a phenol-formaldehyde resin and a vinyl resin.

9. The magnetic disc as defined in claim 8, wherein said vinyl resin is polyvinyl butyral.

* * * * *